United States Patent
Corbe et al.

(10) Patent No.: US 8,405,542 B2
(45) Date of Patent: Mar. 26, 2013

(54) VARIABLE TRANSMISSION POWER FOR FILL LEVEL MEASURING

(75) Inventors: Bernhard Corbe, Schutterwald (DE); Michael Fischer, Wolfach (DE); Christoph Mueller, Oppenau (DE); Daniel Schultheiss, Hornberg (DE)

(73) Assignee: VEGA Grieshaber KG, Wolfach (DE)

( * ) Notice: Subject to any disclaimer, the term of this patent is extended or adjusted under 35 U.S.C. 154(b) by 194 days.

(21) Appl. No.: 12/507,845

(22) Filed: Jul. 23, 2009

(65) Prior Publication Data

US 2010/0052974 A1    Mar. 4, 2010

Related U.S. Application Data

(60) Provisional application No. 61/094,156, filed on Sep. 4, 2008.

(30) Foreign Application Priority Data

Sep. 4, 2008   (EP) .................................... 08163708

(51) Int. Cl.
   *G01S 13/08*   (2006.01)
   *G01F 23/284*  (2006.01)
(52) U.S. Cl. ........................ 342/124; 324/644
(58) Field of Classification Search ............ 342/124; 324/644
   See application file for complete search history.

(56) References Cited

U.S. PATENT DOCUMENTS

| 4,225,866 | A |   | 9/1980 | Levine |
| 4,806,937 | A | * | 2/1989 | Peil ................................. 342/175 |
| 4,870,421 | A | * | 9/1989 | Peil et al. ...................... 342/175 |
| 5,136,300 | A | * | 8/1992 | Clarke et al. ................... 342/175 |
| 6,043,712 | A | * | 3/2000 | Leizerovich et al. .......... 330/279 |
| 6,069,526 | A | * | 5/2000 | Ballantyne ....................... 330/51 |
| 7,317,903 | B2| * | 1/2008 | Omori et al. ................ 455/127.3 |
| 7,589,664 | B2| * | 9/2009 | Jirskog ........................... 342/124 |
| 2005/0170788 | A1 | * | 8/2005 | Tanaka et al. ................... 455/73 |
| 2006/0055585 | A1 | * | 3/2006 | Nagasaku et al. ............... 342/28 |
| 2007/0101810 | A1 |   | 5/2007 | Erikson et al. |
| 2007/0188374 | A1 | * | 8/2007 | Fehrenbach et al. .......... 342/124 |

FOREIGN PATENT DOCUMENTS

| CN | 1632475       | 6/2005 |
| DE | 29 42 541     | 9/1980 |
| DE | 10 2005057094 | 6/2007 |
| EP | 1 992 923     | 11/2008 |
| GB | 2 307 809     | 6/1997 |
| WO | 02/14901      | 2/2002 |
| WO | 02/14902      | 2/2002 |

OTHER PUBLICATIONS

Mikrowellensensorik, ÖMicrowave Sensing, Elektrotechnik und Informationstechnik, Springer Verlag, Wien, AT, vol. 113, No. 7/08, Jul. 1, 1996, pp. 500-512, XP000633390.

\* cited by examiner

*Primary Examiner* — Matthew M Barker
(74) *Attorney, Agent, or Firm* — Fay Kaplun & Marcin, LLP

(57) ABSTRACT

The transmission power of a fill level radar is varied in that the transmission power is switched, by a signal switch, from a first transmission power to a second transmission power. This switching takes place, for example, by bypassing the high-frequency amplifier or by switching off a drain voltage.

12 Claims, 5 Drawing Sheets

VARIABLE TRANSMISSION POWER FOR FILL LEVEL MEASURING

REFERENCE TO RELATED APPLICATION

This application claims the benefit of the filing date of EP Patent Application Serial No. 08 163 708.4 filed on 4 Sep. 2008 and U.S. Provisional Patent Application Ser. No. 61/094,156 filed on 4 Sep. 2008, the disclosure of which applications is hereby incorporated herein by reference.

FIELD OF THE INVENTION

The present invention relates to fill level measuring. In particular, the invention relates to an electronics module for a fill level radar for varying the transmission power of a transmitting signal, to a fill level radar, to the use of an electronics module for fill level measuring, as well as to a method for varying the transmission power of a transmitting signal.

TECHNOLOGICAL BACKGROUND

Known fill-level measuring devices for contactless measuring comprise an antenna that emits and receives signals (radar signals, microwaves or ultrasound) in order to determine the fill level of a medium, e.g. in a product container. In such a setup the antenna of such a fill-level measuring device is, for example, arranged within the container.

In this arrangement the quality of the measuring signals received during fill level measuring with the use of a fill-level measuring device strongly depends on the quality of the transmitting/receiving unit. In particular, in this arrangement the strength or amplitude of the receiving signal is critical. If the amplitude is low, for example because the measuring signal has been considerably attenuated on its path from the transmitter to the product and back, or if the product provides poor reflection, the quality of signal evaluation and thus the measuring result suffer. In contrast to this, if the amplitude of the received signal is excessive, the receiving unit often overdrives. This subsequently results in incorrect measuring.

From DE 10 2005 057 094 A1 it is known to vary the transmission power for measuring a fill level in that switching occurs between two different oscillators, in other words between two different sources for generating transmitting signals which in each case comprise different transmission powers.

SUMMARY OF THE INVENTION

The following are stated: an electronics module for a fill level radar for varying the transmission power of a transmitting signal, a fill level radar comprising an electronics module, the use of an electronics module for fill level measuring, and a method for varying the transmission power of a transmitting signal.

The exemplary embodiments described equally relate to the electronics module, the fill level radar, the use and the method. In other words, the exemplary embodiments described below in regard to the electronics module can also be implemented in the fill level radar, the use and the method, and vice-versa.

According to an exemplary embodiment of the invention, an electronics module for a fill level radar for varying the transmission power (also denoted as transmission output) of a transmitting signal is stated, which electronics module is used for fill level measuring, wherein the transmitting signal has a frequency above 20 GHz. The electronics module comprises a source for generating the transmitting signal, a high-frequency amplifier for amplifying the transmission output of the transmitting signal, and a first signal switch for switching the transmitting signal, after it has been generated by the source, from a first transmission output to a second transmission output.

There is no need to provide several signal sources for generating transmitting signals of different outputs. It should be noted that the electronics module can be used for frequencies above 20 GHz, for example at 26 GHz or ranging from between 70 and 110 GHz. In this frequency range the sole use of a conventional variable amplifier (of a so-called variable gain amplifier VGA) would not be advantageous. Commercially available VGAs comprise a change in amplification of only approx. 10 to 15 dB in this frequency range. However, changes in amplification of approx. 30 dB are desirable.

It should be noted that the electronics module issues similar signal shapes both in relation to the first and in relation to the second transmission outputs so that a choice between the two transmitting signals may be made for measuring a fill level, without this requiring extensive processing.

According to a further exemplary embodiment of the invention, the high-frequency amplifier is designed as a transistor, wherein the first signal switch is designed for switching on and switching off a drain voltage of the transistor.

In other words, the gate voltage remains unchanged. If the output of the transmitting signal is to be reduced, the drain voltage is switched off.

There may be an advantage, when compared to reducing the transmission output by means of an attenuation element with variable attenuation, in that, among other things, less energy may be consumed at a low transmission output.

According to a further exemplary embodiment of the invention, the high-frequency amplifier is designed as a field effect transistor or as a bipolar transistor.

The first signal switch is, for example, located in the feed line to the drain input of the amplifier.

According to a further exemplary embodiment of the invention, the high-frequency amplifier is designed as a monolithic microwave integrated circuit, MMIC.

According to a further exemplary embodiment of the invention, the electronics module further comprises a second signal switch that switches and is controlled parallel to the first signal switch.

According to a further exemplary embodiment of the invention, the electronics module comprises a first detour (by pass) line for bypassing the high-frequency amplifier, wherein the first signal switch is designed for switching between the high-frequency amplifier and the first detour line.

In other words, there is no need to switch the amplifier off in order to reduce amplification; instead, the amplifier is bypassed by way of the detour line. In this way a situation may be prevented in which the input adaptations and output adaptations of the electronics module change as a result of switching off the high-frequency amplifier by way of an operating voltage. In this manner the pulse form of the microwave pulses (transmitting signals) may to a large extent be kept constant.

According to a further exemplary embodiment of the invention, the electronics module comprises a second detour line. Furthermore, a third signal switch is provided, which is used for switching between the first detour line and the second detour line.

The two detour lines can comprise different attenuation so that there are thus three different transmission outputs available merely by operating the switches.

According to a further exemplary embodiment of the invention, an attenuation element is provided, which is arranged in the first detour line or in the second detour line.

For example, the above can be a variable attenuation element that is designed to attenuate the transmitting signal with controllable or even adjustable attenuation.

For example, the attenuation element is designed as an attenuation mat that is bonded to a substrate. The attenuation element thus need not be integrated in the detour line, but instead can be affixed to the line. By means of changing the size, thickness or some other parameter of the attenuation mat the attenuation factor can be set accordingly, depending on the requirements that the fill-level measuring device has to meet.

By controlling the attenuation, said attenuation can be individually adjusted depending on requirements. Thus, if the output of the transmitting signal is excessive despite the amplifier already being bypassed, or despite the drain voltage being switched off, the transmission output may be further reduced.

According to a further exemplary embodiment of the invention, the high-frequency amplifier is designed to amplify the transmitting signal with controllable or even adjustable amplification. Any change in amplification is achieved by a change in the drain voltage (in other words the operating voltage).

According to a further exemplary embodiment of the invention, the electronics module further comprises a control unit for controlling the signal switch or the signal switches, for attenuating the attenuation element, and/or for amplifying the high-frequency amplifier.

Furthermore, several individual control units may be provided, which individually control the various elements.

According to a further exemplary embodiment of the invention, a fill level radar with an electronics module as described above is stated. The fill level radar is, for example, designed as a pulse radar system.

According to a further exemplary embodiment of the invention, the fill level radar comprises a receiving unit, wherein the control unit is coupled to the receiving unit, and wherein the control unit is designed to control the electronics module such that the second, lower transmission output is switched on when the strength of the receiving signal exceeds a pre-set threshold value.

In this way test measurements may be carried out to obtain a feeling as to whether or not the received output is situated in an acceptable, favourable, range. If the received signal strength exceeds an upper threshold value, for example the output can be switched back in that the amplifier is bypassed. On the other hand if, for example, the strength of the receiving signal is below a second threshold value, the output of the transmitting signal may be increased by switching the amplifier on.

According to a further exemplary embodiment of the invention, receiving, determining the output, and the comparison with the threshold value of the receiving signals take place automatically.

For example, such signal strength measurements may be carried out automatically at regular intervals. Thus, largely continuous regulation of the transmission output may occur, which regulation in each case matches the external conditions.

According to a further exemplary embodiment of the invention, the use of an electronics module as described above is stated for fill level measuring.

According to a further exemplary embodiment of the invention, a method for varying the transmission output of a transmitting signal is stated, which method is used for fill level measuring. In this method, at first a transmitting signal is generated. This is followed by amplification of the transmission output of the transmitting signal to an amplified transmission output by means of an amplifier. If the transmission output is excessive, switching of the transmitting signal takes place, after said signal has been generated, from the amplified transmission output to a second, lower, transmission output. To this effect, for example, the signal path is changed so that the transmitting signal no longer travels through the amplifier, but instead bypasses the amplifier. Furthermore, switching can also involve switching off the drain voltage of the amplifier.

There may be no need to provide several signal sources for this.

According to a further exemplary embodiment of the invention, a program element is stated which, when executed on a processor, instructs the processor to carry out the method-related steps stated above.

In this arrangement the program element can, for example, be part of software that is stored on a processor of the fill-level measuring device. In this arrangement the processor can also form part of the invention. Furthermore, this exemplary embodiment of the invention comprises a program element that from the very outset uses the invention, as well as also comprising a computer program element which, by way of an update, causes an existing program to use the invention.

According to a further exemplary embodiment of the invention, a computer-readable medium is stated on which a program element is stored which, when executed on a processor, instructs the processor to carry out the method-related steps stated above.

Below, exemplary embodiments of the invention are described with reference to the figures.

DETAILED DESCRIPTION OF EXEMPLARY EMBODIMENTS

Figure 1A:
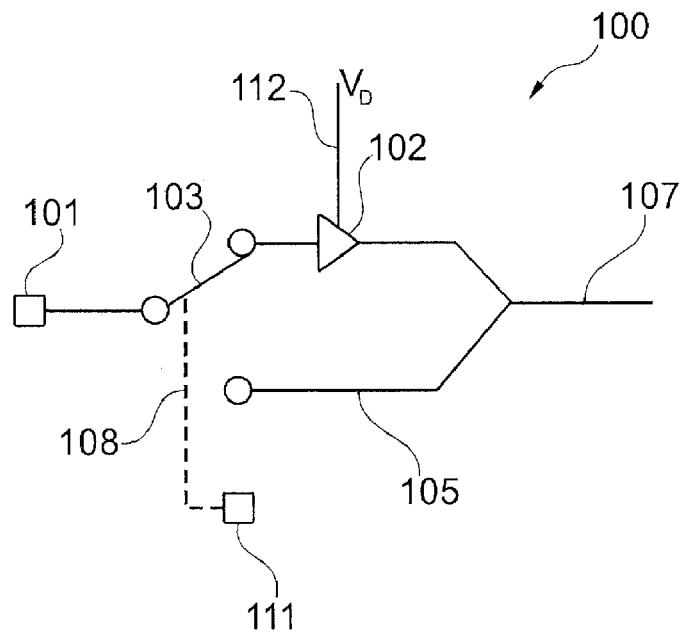
FIG. 1A shows a block diagram of an electronics module according to an exemplary embodiment of the invention.

The illustrations in the figures are diagrammatic and not to scale.

In the following description of the figures the same reference characters are used for identical or similar elements.

FIG. 1A shows a block diagram of an electronics module 100 that comprises a signal switch 103 and a detour line 105. A signal source 101 is provided which generates the transmitting signal.

Depending on the desired transmission output at the output 107 of the electronics module 100, the signal switch 103 is switched either so that the detour line 105 is used for conducting the transmitting signal, or (as shown) so that the upper signal path is used.

In the upper signal path a high-frequency amplifier 102 is incorporated which is used to amplify the output of the transmitting signal. This amplifier 102 is fed by way of a drain voltage $V_D$ 112.

The signal switch 103 is controlled or switched by way of the control unit 111 and the control line 108.

In this way it may thus be possible to vary the output of the transmitting signal at the output of the electronics module 107 without the signal shape changing significantly in this process.

Figure 1B:
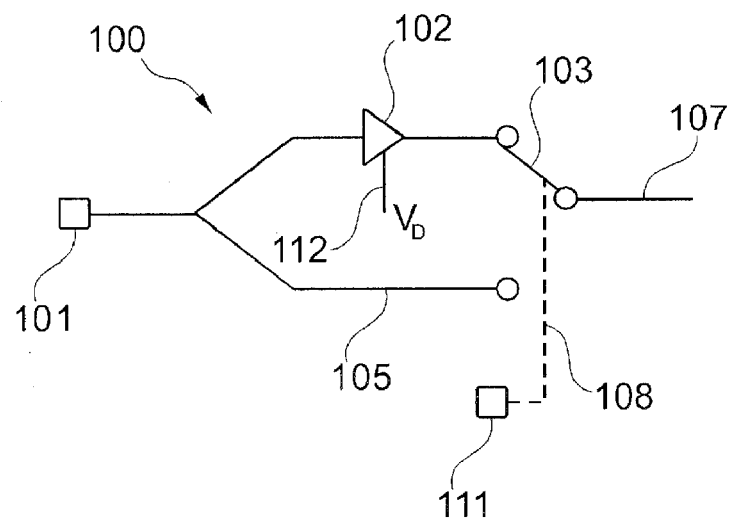
FIG. 1B shows a block diagram of an electronics module according to a further exemplary embodiment of the invention.

FIG. 1B shows a block diagram of a further exemplary embodiment of the electronics module 100 in which the signal switch 103 is not arranged on the input side of the amplifier 102 but instead on its output side.

Figure 1C:
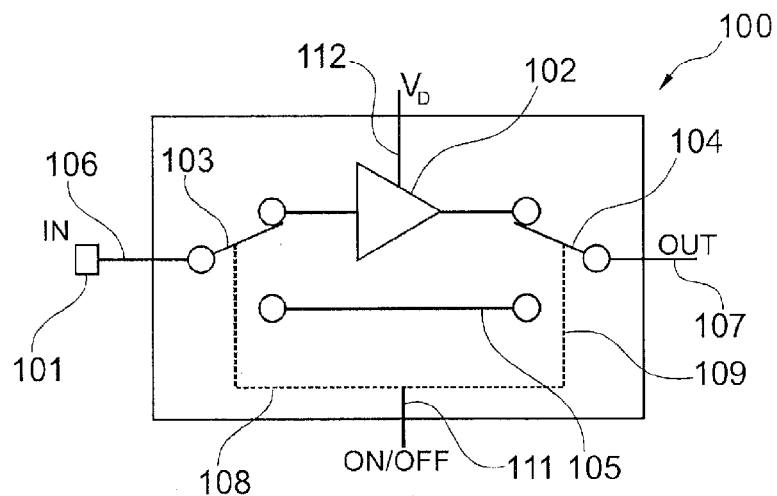
FIG. 1C shows a block diagram of an electronics module according to a further exemplary embodiment of the invention.

FIG. 1C shows a further exemplary embodiment of the electronics module 100 in which two signal switches 103, 104 are provided, of which signal switches 103, 104 one is arranged on the input side and the other on the output side of the high-frequency amplifier 102.

The first signal switch 103 directly follows from the feed line 106 from the source 101 and is driven by way of the line 108 that is connected to the control unit 111. The second signal switch 104, which is connected to the output 107 of the electronics module, is driven by way of the control line 109 that is connected to the control unit 111.

Figure 2:
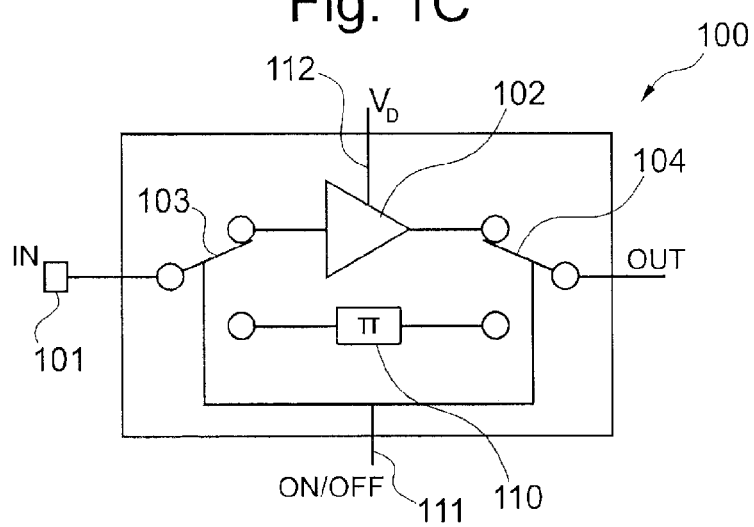
FIG. 2 shows a block diagram of an electronics module according to a further exemplary embodiment of the invention.

In the detour line 105 additional attenuation 10 can be provided. This is shown, for example, in FIG. 2.

The two signal switches 103, 104 are designed as changeover switches. They may make it possible to lead the high frequency signal past the amplifier 102. In this case the amplifier 102 can also be switched off so that electrical current can be saved. This applies to all the described exemplary embodiments of FIGS. 1A, 1B, 1C, 2, 3, 4, 5.

Figure 3:
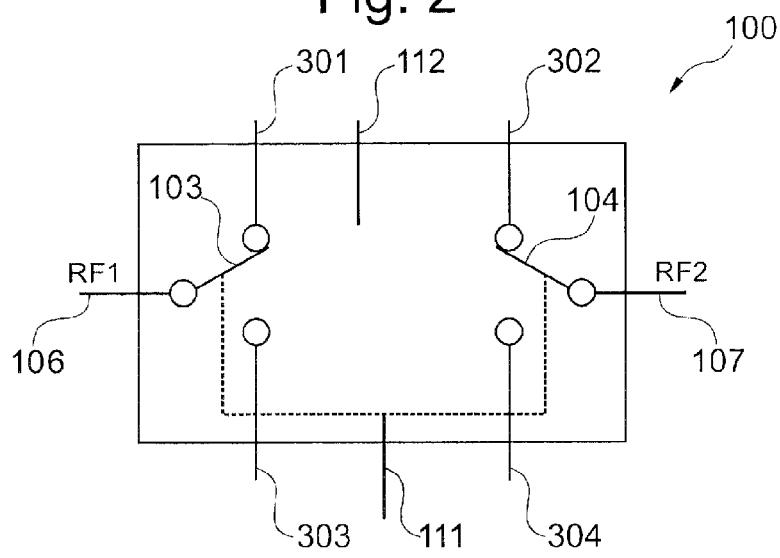
FIG. 3 shows a block diagram of an electronics module according to a further exemplary embodiment of the invention.

As shown in FIG. 3 it may also be possible to separate the high-frequency amplifier 102, the attenuation element 110 and the switches 103, 104. In this case the high-frequency amplifier 102 (not shown in FIG. 3) is connected to the lines 301, 302. In this case the detour line (if applicable with the attenuation element 110) is connected to the lines 303, 304.

RF1 designates the feed line from the source 101 to the first switch 103. RF2 designates the output, in other words the line 107, from the second switch 104 to the antenna or to a branch, arranged upstream, for example a circulator 506 (see FIG. 5).

By way of the control pin of the component shown in FIG. 3, the switches 103, 104 can be driven together. It may also be possible to provide two separate switch modules that comprise separate control pins and that may thus be driven separately of each other.

Figure 4:
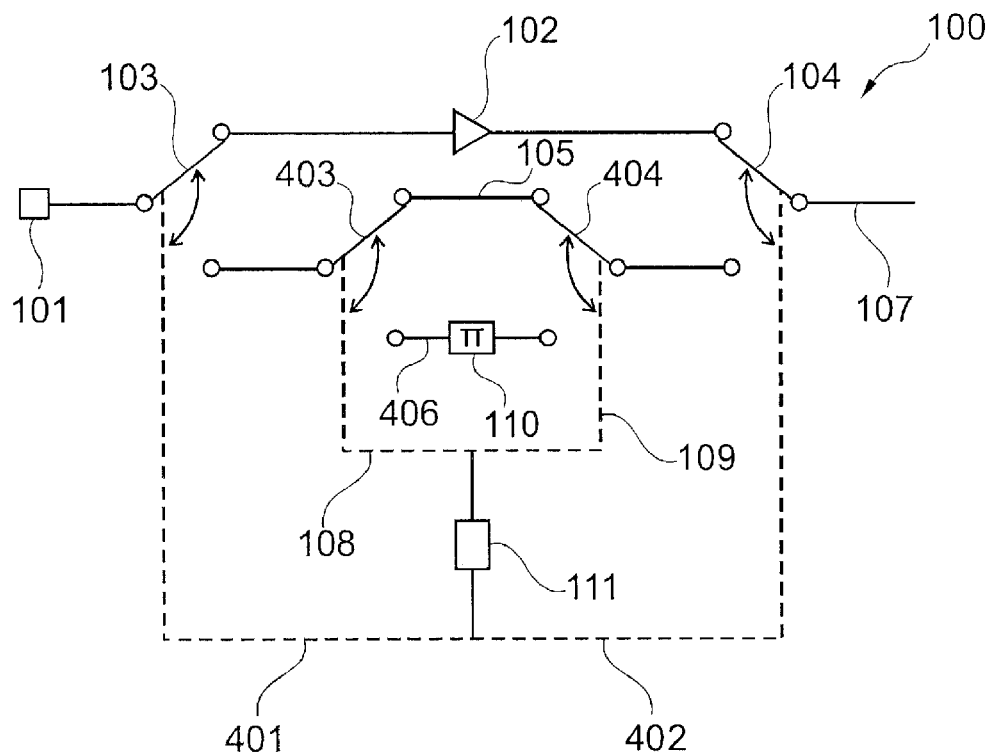
FIG. 4 shows a block diagram of an electronics module according to a further exemplary embodiment of the invention.

FIG. 4 shows an exemplary embodiment of an electronics module 100 comprising four signal switches 103, 104, 403, 404. The possible switching processes are indicated by the four double arrows.

As shown in FIG. 4 it may thus be possible to switch on or bypass the amplifier 102 by way of the controls 401, 402 of the switches 103, 104. Furthermore, it may be possible, by way of the control lines 108, 109, to switch between a mere bypass or detour line 105 and a detour line 406 with an attenuation element 110, depending on the desired output transmitting power.

All the switches are controlled by way of the control unit 111.

Furthermore, the control unit 111 can be designed to control the attenuation element 110 (if the latter comprises variable attenuation) or to control the drain voltage (for example switching on or switching off the source voltage).

Figure 5:
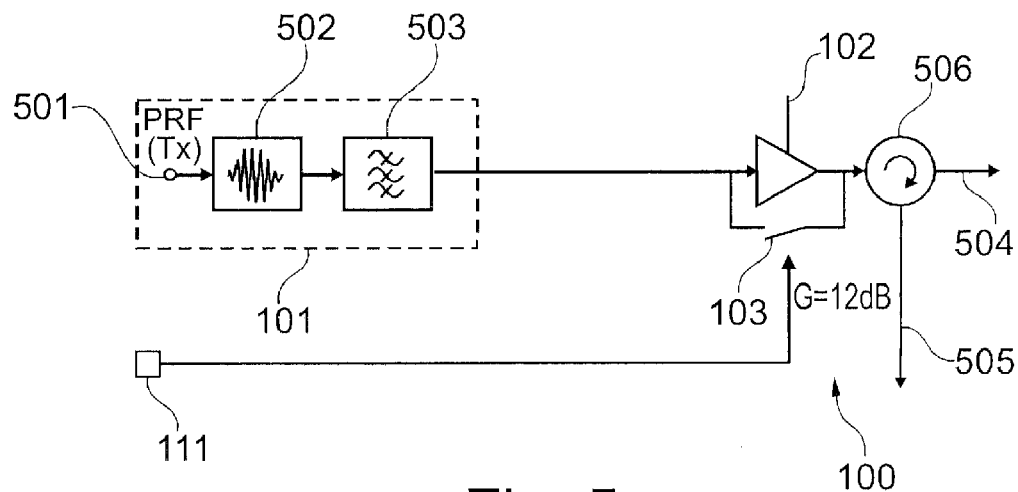
FIG. 5 shows a block diagram of an electronics module according to a further exemplary embodiment of the invention.

FIG. 5 shows a basic wiring diagram according to a further exemplary embodiment of the electronics module 100, which comprises a transmission stage with a so-called PRF oscillator 501, 502, a filter 503 (source 101), a high-frequency amplifier 102 with a detour line with a switch 103, as well as a circulator 506.

The transmitting signal is fed, by way of the line 504, from the circulator 506 to the antenna of the fill-level measuring device. The receiving signal travels from the antenna (not shown in FIG. 5) back to the circulator 506 and then to the receiver by way of the line 505.

By way of the control unit 111 the transmission output can be changed over.

Figure 6:
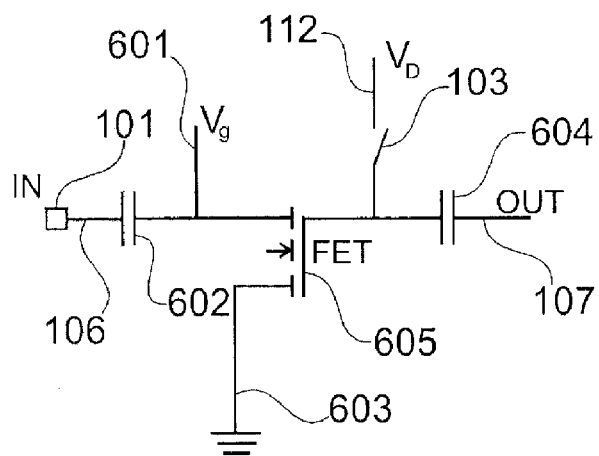
FIG. 6 shows a block diagram of an electronics module according to a further exemplary embodiment of the invention.

Furthermore, it may be possible to switch off the supply voltage of the high-frequency amplifier 102. In the case of a field-effect transistor amplifier an exemplary wiring diagram is shown in FIG. 6, in which the amplifier arrangement is shown.

The field effect transistor 605 is pushed to a suitable operating point by means of the gate voltage 601 $V_g$. Switching the operating voltage on or off then takes place by switching the drain voltage 112 $V_d$ on or off by means of the signal switch 103. The gate voltage remains, for example, always unchanged. Consequently, input matching of the amplifier arrangement does not change or changes only insignificantly. In this way differences in levels of 25 to 30 dB are possible. There is no need to provide a detour line, but it can nevertheless be used.

The reference characters 602, 604 designate capacitors at the input or output of the field effect transistor. The third connection of the field effect transistor is connected to the circuit mass (see reference character 603).

The same solution may result in the case of MMIC amplifiers. As a rule, these components also comprise a gate voltage connection and a drain voltage connection. During variation in the transmission output, the gate voltage always remains switched on. In this way it may be possible to achieve a change in amplification without changing input matching.

In a certain region it may furthermore be possible, by varying the gate voltage, to set the attenuation in the switched-off state, or the amplification in the switched-on state.

The electronics module can (generally without the source) be integrated as an MMIC or it can be constructed with the use of individual components. The signal switches can be operated individually (by means of separate control connections) or together.

Furthermore, the amplifier can be switched on and off either by way of the operating voltage or by way of a shutdown control connection. This can take place concurrently with signal change-over switches, or it can take place independently of them.

Moreover, attenuation in the detour line can be variable. Furthermore, the amplifier can be designed as a variable gain amplifier (VGA).

In the case of switching the supply voltage on or off, a single FET, a bipolar transistor or an MMIC can be used.

Figure 7:
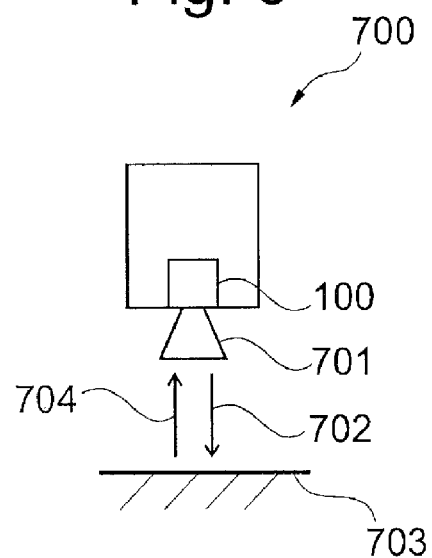
FIG. 7 shows a fill level radar according to an exemplary embodiment of the invention.

FIG. 7 shows a fill level radar 700 that comprises an electronics module 100 and an antenna 701. The antenna is used to transmit the transmitting signal 702 in the direction of the product surface 703, and is used to receive a receiving signal 704 that has been reflected by said product surface 703.

Figure 8:
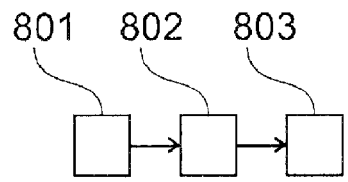
FIG. 8 shows a flow chart of a method according to an exemplary embodiment of the invention.

FIG. 8 shows a flow chart of a method in which in step 801 a transmitting signal is generated. In step 802 the transmission output of the transmitting signal is amplified by a high-frequency amplifier. In step 803, a changeover takes place from the amplified transmission output to a reduced transmission output in that either a detour line is used, or the drain voltage of the amplifier is capped by means of a signal switch.

Figure 9:
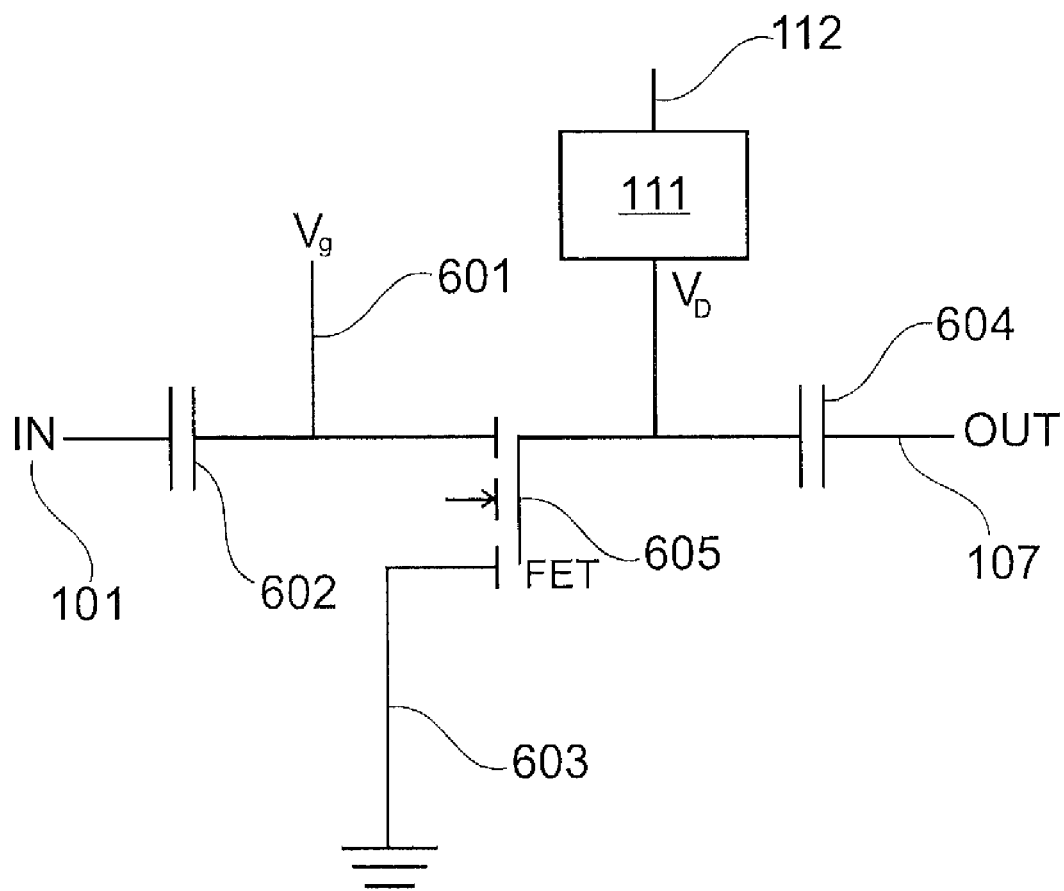
FIG. 9 shows a block diagram of an electronics module according to a further exemplary embodiment of the invention.

FIG. 9 shows a wiring diagram of an arrangement in which the control unit 111 varies the drain voltage. In this arrangement the gate voltage is constantly present. By varying the drain voltage it is possible to influence amplification of the amplifier. With this arrangement it is also possible to achieve intermediate values between the two amplifier states on and off (drain voltage on or off). A signal switch is not required for this, but it can nevertheless be provided (as shown in FIG. 6). Control can, for example, take place by means of a D/A converter with the use of a microcontroller. This may result in fine amplification gradation or continuous amplification regulation.

Any non-linearity between amplification and drain voltage may be corrected, by means of a stored reference curve, by the microcontroller. Likewise, a known temperature drift may be corrected by the microcontroller.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. An electronics module for a fill level radar for varying a transmission output of a transmitting signal with a transmitting signal frequency above 20 GHz, the electronics module configured to measure a fill level, comprising:
   a source configured to generate the transmitting signal;
   a high-frequency amplifier configured to amplify the transmission power of the transmitting signal; and
   a first signal switch configured to switch the transmitting signal, after the transmitting signal has been generated by the source, from a first transmission power to a second transmission power,
   wherein the high-frequency amplifier is a monolithic microwave integrated circuit (MMIC),
   wherein the first signal switch is configured to switch on and off a drain voltage of the MMIC,
   wherein the electronics module is configured to reduce the transmission power from the first transmission power to the second transmission power by switching off the drain voltage of the high-frequency amplifier, and
   wherein the gate voltage remains switched on.

2. The electronics module according to claim 1, further comprising: a second signal switch switching parallel to the first signal switch.

3. The electronics module according to claim 1, further comprising: a first detour line bypassing the high-frequency amplifier; wherein the first signal switch switches between the high-frequency amplifier and the first detour line.

4. The electronics module according to claim 3, further comprising: a second detour line; and a third signal switch switching between the first detour line and the second detour line.

5. The electronics module according to claim 4, further comprising: an attenuation element arranged in one of the first detour line and in the second detour line.

6. The electronics module according to claim 5, further comprising: a control unit controlling the signal switches for one of attenuating the attenuation element and amplifying the high-frequency amplifier.

7. The electronics module according to claim 1, wherein the high-frequency amplifier amplifies the transmitting signal with controllable attenuation.

8. A fill level radar, comprising:
   an electronics module including (a) a source configured to generate a transmitting signal; (b) a high-frequency amplifier configured to amplify the transmission power of the transmitting signal; and (c) a first signal switch configured to switch the transmitting signal, after the transmitting signal has been generated by the source, from a first transmission power to a second transmission power,
   wherein the high-frequency amplifier is a monolithic microwave integrated circuit (MMIC), and
   wherein the first signal switch is configured to switch on and off a drain voltage of the MMIC,
   wherein the electronics module is configured to reduce the transmission power from the first transmission power to the second transmission power by switching off the drain voltage of the high-frequency amplifier, and
   wherein the gate voltage remains switched on.

9. A method for varying a transmission power of a transmitting signal and for measuring a fill level, comprising:
   generating the transmitting signal with a transmitting signal frequency of more than 20 GHz;
   amplifying a transmission power of the transmitting signal to an amplified transmission power using an amplifier; and
   switching, using a first signal switch, the transmitting signal, after the transmission signal has been generated, from the amplified transmission power to a second, lower, transmission power,
   wherein the amplifier is a monolithic microwave integrated circuit (MMIC), and
   wherein the first signal switch switches on and off a drain voltage of the MMIC,
   wherein switching is performed by switching off the drain voltage of the high-frequency amplifier, and
   wherein a gate voltage remains switched on.

10. A program element embodied on a non-transitory computer readable medium which, when executed on a processor, instructs the processor to carry out the following steps:
    generating a transmitting signal with a transmitting signal frequency of more than 20 GHz;

amplifying a transmission power of the transmitting signal to an amplified transmission power using an amplifier; and switching, using a first signal switch, the transmitting signal, after the transmitting signal has been generated, from the amplified transmission power to a second, lower, transmission power, wherein the amplifier is a monolithic microwave integrated circuits (MMIC), wherein the first signal switch switches on and off a drain voltage of the MMIC, wherein switching is performed by switching off the drain voltage of the high-frequency amplifier, and wherein a gate voltage remains switched on.

11. A non-transitory computer-readable medium on which a program element is stored which, when executed on a processor, instructs the processor to carry out the following steps:

generating a transmitting signal with a transmitting signal frequency of more than 20 GHz;

amplifying a transmission power of the transmitting signal to an amplified transmission power using an amplifier; and switching, using a first signal switch, the transmitting signal, after the transmitting signal has been generated, from the amplified transmission power to a second, lower, transmission power, wherein the amplifier is a monolithic microwave integrated circuit (MMIC), wherein the first signal switch switches on and off a drain voltage of the MMIC, wherein switching is performed by switching off the drain voltage of the high-frequency amplifier, and wherein a gate voltage remains switched on.

12. An electronics module for a fill level radar for varying a transmission output of a transmitting signal with a transmitting signal frequency above 20 GHz, the electronics module measuring a fill level, comprising:

a source configured to generate the transmitting signal;

a high-frequency amplifier configured to amplify the transmission power of the transmitting signal; and a first signal switch configured to switch the transmitting signal, after the transmitting signal has been generated by the source, from a first transmission power to a second transmission power, wherein the high-frequency amplifier is a field effect transistor (FET), wherein the first signal switch is configured to switch on and off a drain voltage of the FET, wherein the electronics module is configured to reduce the transmission power from the first transmission power to the second transmission power by switching off the drain voltage of the high-frequency amplifier, and wherein the gate voltage remains switched on.

* * * * *